United States Patent
Chang

(10) Patent No.: US 9,573,017 B2
(45) Date of Patent: Feb. 21, 2017

(54) BUFFER BOARD STRUCTURE OF A TREADMILL

(71) Applicant: Chung-Fu Chang, Changhua County (TW)

(72) Inventor: Chung-Fu Chang, Changhua County (TW)

(*) Notice: Subject to any disclaimer, the term of this patent is extended or adjusted under 35 U.S.C. 154(b) by 0 days.

(21) Appl. No.: 14/813,365

(22) Filed: Jul. 30, 2015

(65) Prior Publication Data

US 2016/0184625 A1 Jun. 30, 2016

(30) Foreign Application Priority Data

Dec. 30, 2014 (TW) .............................. 103146457 A

(51) Int. Cl.
*A63B 22/02* (2006.01)
*A63B 22/00* (2006.01)
(Continued)

(52) U.S. Cl.
CPC .............. *A63B 22/0214* (2015.10); *B32B 3/18* (2013.01); *B32B 5/022* (2013.01); *B32B 5/024* (2013.01); *B32B 7/005* (2013.01); *B32B 7/12* (2013.01); *B32B 9/02* (2013.01); *B32B 9/04* (2013.01); *B32B 9/042* (2013.01); *B32B 9/045* (2013.01); *B32B 9/047* (2013.01); *B32B 21/042* (2013.01);
(Continued)

(58) Field of Classification Search
CPC ..... A63B 22/00; A63B 22/02; A63B 22/0207; A63B 22/0214; A63B 2071/0063; B32B 5/022; B32B 5/024; B32B 5/12; B32B 2250/42;B32B 2255/02; B32B 2255/08; B32B 2307/744; B32B 3/18; B32B 7/005; B32B 7/12; B32B 9/02; B32B 9/04; B32B 9/042; B32B 9/045; B32B 9/047; B32B 21/042; B32B 27/08; B32B 2307/546; B32B 2307/56
See application file for complete search history.

(56) References Cited

U.S. PATENT DOCUMENTS 3,689,066 A * 9/1972 Hagen .................... A63B 22/02
198/811
4,810,551 A * 3/1989 Chu ......................... B27J 1/003
144/333

(Continued)

*Primary Examiner* — Joshua Lee
(74) *Attorney, Agent, or Firm* — Jackson IPG PLLC; Demian K. Jackson

(57) ABSTRACT

A buffer board structure of a treadmill includes bamboo layers made by attaching bamboo sheets side by side, a bottom surface of which is adhered by a membrane layer whereby the bamboo sheets are firmly stuck on the membrane layer. Each membrane layer has an upper and lower faces respectively stuck between the bamboo layers. The bamboo sheets of each bamboo layer face the same juxtaposing direction, whereas bamboo layers juxtaposed lengthways provide a better buffer. By setting one membrane layer between two bamboo layers, contact faces of the bamboo layers and the membrane layer adhered together become smoother, and an adhesive fills in a gap more evenly. A slip resistant layer is stuck on the top bamboo layer. A smoother buffering effect and a stable juxtaposition are obtained when the bamboo layers are trodden to prevent the breakdown of buffer relations between the bamboo sheets and the membrane layers.

2 Claims, 5 Drawing Sheets

(51) Int. Cl.
*A63B 71/00* (2006.01)
*B32B 5/02* (2006.01)
*B32B 7/00* (2006.01)
*B32B 7/12* (2006.01)
*B32B 9/02* (2006.01)
*B32B 9/04* (2006.01)
*B32B 21/04* (2006.01)
*B32B 27/08* (2006.01)
*B32B 3/18* (2006.01)

(52) U.S. Cl.
CPC .......... *B32B 27/08* (2013.01); *B32B 2307/546* (2013.01); *B32B 2307/56* (2013.01); *B32B 2307/744* (2013.01)

(56) References Cited

U.S. PATENT DOCUMENTS

| | | | | |
|---|---|---|---|---|
| 5,279,528 A * | 1/1994 | Dalebout | ........... | A63B 22/0023 482/54 |
| 5,786,063 A * | 7/1998 | Shibusawa | ............... | B27M 1/08 144/333 |
| 5,951,441 A * | 9/1999 | Dalebout | ............... | A63B 22/02 198/844.2 |
| 5,980,430 A * | 11/1999 | Wang | ..................... | A63B 22/02 482/51 |
| 6,117,053 A * | 9/2000 | Chiu | ....................... | A63B 22/02 482/51 |
| 6,887,185 B1 * | 5/2005 | Kuo | ................... | A63B 22/0214 482/54 |
| 7,647,957 B2 * | 1/2010 | Pasha | ....................... | B27D 1/04 144/332 |
| 7,981,233 B2 * | 7/2011 | Wellwood | ............... | B27D 1/04 144/329 |
| 8,033,387 B2 * | 10/2011 | Wang | ..................... | B65G 15/54 198/847 |
| 8,173,236 B1 * | 5/2012 | McDonald | ............... | B27D 1/06 428/47 |
| 2003/0040405 A1 * | 2/2003 | Watterson | ............... | A63B 22/02 482/51 |
| 2003/0045403 A1 * | 3/2003 | Watterson | .......... | A63B 22/0207 482/51 |
| 2004/0058786 A1 * | 3/2004 | Nerio | ..................... | A63B 21/00 482/54 |
| 2006/0205568 A1 * | 9/2006 | Huang | ............... | A63B 22/0207 482/54 |
| 2006/0217015 A1 * | 9/2006 | Chen | ......................... | B32B 3/16 442/36 |
| 2007/0049465 A1 * | 3/2007 | Wu | ..................... | A63B 22/0235 482/54 |
| 2009/0000230 A1 * | 1/2009 | Dai | .......................... | B32B 9/02 52/403.1 |
| 2009/0176628 A1 * | 7/2009 | Radding | ................. | A63B 22/02 482/54 |
| 2010/0297411 A1 * | 11/2010 | Tsai | ......................... | B32B 9/02 428/213 |
| 2010/0304936 A1 * | 12/2010 | Wang | ..................... | A63B 22/02 482/54 |
| 2011/0111166 A1 * | 5/2011 | Chang | ..................... | A63B 22/02 428/105 |
| 2011/0111167 A1 * | 5/2011 | Chang | ..................... | A63B 22/02 428/106 |
| 2011/0152037 A1 * | 6/2011 | Wu | ..................... | A63B 22/0207 482/54 |
| 2011/0274872 A1 * | 11/2011 | Yu | ............................ | B27D 1/04 428/106 |
| 2013/0130868 A1 * | 5/2013 | Hou | ................... | A63B 22/0228 482/54 |
| 2013/0130869 A1 * | 5/2013 | Hou | ....................... | A63B 22/02 482/54 |
| 2014/0130725 A1 * | 5/2014 | Liu | ....................... | E01F 15/141 114/219 |

* cited by examiner

BUFFER BOARD STRUCTURE OF A TREADMILL

BACKGROUND OF THE INVENTION

1. Field of the Invention

This invention relates to an application of a treadmill and relates particularly to a buffer board structure of a treadmill.

2. Description of the Related Art

Generally, a treadmill uses a buffer board as a support below a belt. Because a quite large treading force is imparted to the buffer board when a user runs the treadmill, no buffer bounce will make the user quite uncomfortable. In this regard, it is common to install a buffer cushion and a buffer mechanism under the buffer board, stick a foam layer to the buffer board and then stick a woven layer to the foam layer. The aforesaid arrangement allows the belt to operate smoothly and provides a buffering effect with comfort.

However, the user easily treads on a same position and repeats his treading action, and in the long term this problem may cause the foam layer to collapse permanently. This collapse renders the foam layer unable to retrieve and lose the buffering effect.

This novel invention is made to improve a prior art issued by Taiwan patent No. TWI406686, and this invention and the prior art have the common inventor. The prior art comprises a treadmill buffer board which includes bamboo strips having the appropriate thickness and width. The bamboo strips are classified into longitudinal bamboo strips and latitudinal bamboo strips. At least one longitudinal bamboo strip and at least one latitudinal bamboo strip can be crossed each other and woven into a woven bamboo plywood board. The bamboo plywood board can be superimposed by a desired thickness to construct a woven bamboo laminated plywood board, thereby enhancing the strength and keeping the buffer bounce. Further, the prior art can directly put the longitudinal bamboo strips which are attached side by side over the latitudinal bamboo strip which are attached side by side to construct a stacking bamboo plywood board.

The aforesaid structures are all made of bamboo. After the prior art makes the bamboo laminated plywood board by weaving or superimposing or mixes the aforesaid two kinds of bamboo plywood boards, gaps formed between contact faces of the adjacent bamboo laminated plywood boards are uneven. Thus, distinct gap sizes are obviously formed when adhesives are laid on the contact faces. These gap sizes need to be filled in by adhesives. When the adhesives dry and solidify, the adhesives at respective adhesive positions between the bamboo laminated plywood boards have different amount of dryness and solidification. This situation causes the bamboo laminated plywood boards to have more rigidity and causes an uneven treading buffer. If this structure is applied to a buffer board of a treadmill, the buffering effect will be decreased.

The aforesaid bamboo laminated plywood boards are mainly put one over another and attached by adhesives. When the plywood board is trodden to create a buffer effect, the dryness and solidification causes the adhesives to split easily and the direct contact between the adjacent plywood boards creates friction and incurs noises.

The weaving or superimposing process of bamboo sheets may take time and require a larger amount of adhesives to fill in the larger gaps so that bamboo laminated plywood boards can be completed. This, however, cannot save costs.

SUMMARY OF THE INVENTION

It is an object of this invention to provide a buffer board structure of a treadmill which puts a membrane layer between two adjacent bamboo layers and places bamboos sheets of the adjacent bamboo layers over one another toward a same juxtaposing direction, thereby increasing a buffering effect of the buffer board structure. An adhesive is applied to stick the membrane layer to the multiple juxtaposing bamboo sheets to prevent noises because of friction caused by a direct contact between the bamboo layers when users run the treadmill. With the aid of flexibility of the bamboo layers and a firm adhesion brought about by the membrane layer, a buffering effect can be promoted and a breakdown between the bamboo sheets and between the bamboo layers can be prevented.

Therefore, a buffer board structure of a treadmill in accordance with this invention is provided to solve the aforesaid problems. The buffer board structure is installed under a belt of the treadmill. While being trodden, the belt comes into contact with the buffer board structure. The structure includes a plurality of bamboo layers having respective bamboo sheets which are put one over another and placed side by side toward a same direction. Preferably, a direction where the juxtaposed bamboo sheets are directed is identical to a direction where the treadmill runs. The structure further includes a plurality of membrane layers, each of which is laid between two adjacent bamboo layers. The structure further includes an adhesive arranged between each membrane layer and each bamboo layer so that the adjoining bamboo layer and membrane layer can stick together as a whole. The structure further includes a slip resistant layer adhered to an upper surface of the top bamboo layer.

In some preferred embodiments, the bamboo layer can be made of multiple strips of bamboo sheets parallel to each other.

In the preferred embodiments, the membrane layer can be a whole wood sheet, a combination of wooden laminating sheets, a woven cloth, a non-woven cloth, a whole plastic sheet or a combination of plastic laminating sheets.

The advantages of this invention are more apparent upon reading following descriptions of the preferred embodiment in conjunction with accompanying drawings.

Parts or the arrangement of parts of this invention may be varied. The adopted preferred embodiment of this invention will be described in detail and shown in the drawings.

DETAILED DESCRIPTION OF THE PREFERRED EMBODIMENTS

To attain the aforesaid feature and objects, this invention is described by following descriptions of the preferred embodiment with the accompanying drawings.

Figure 1:
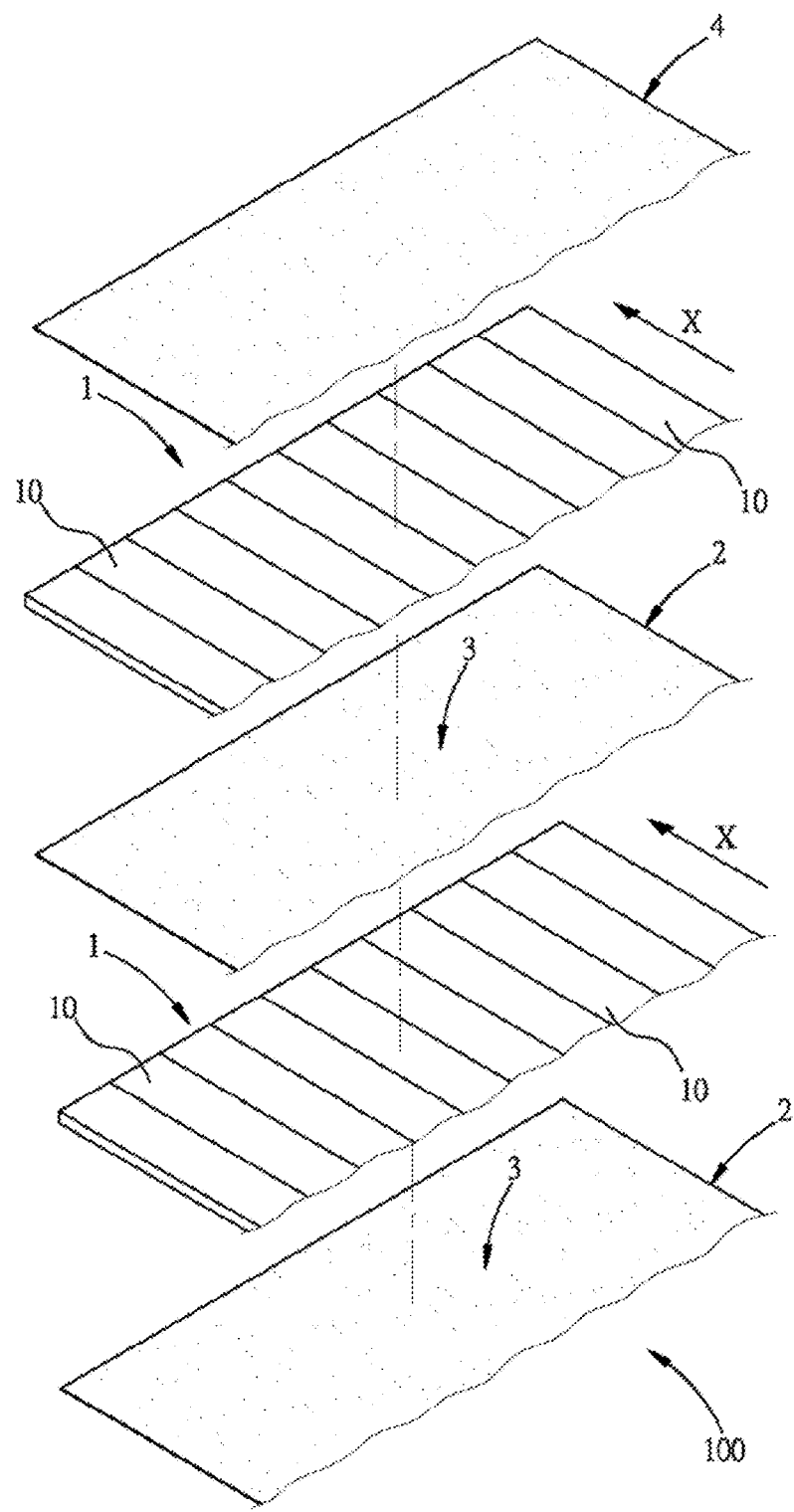
FIG. 1 is an exploded view showing a buffer board structure of a treadmill of this invention.
Figure 2:
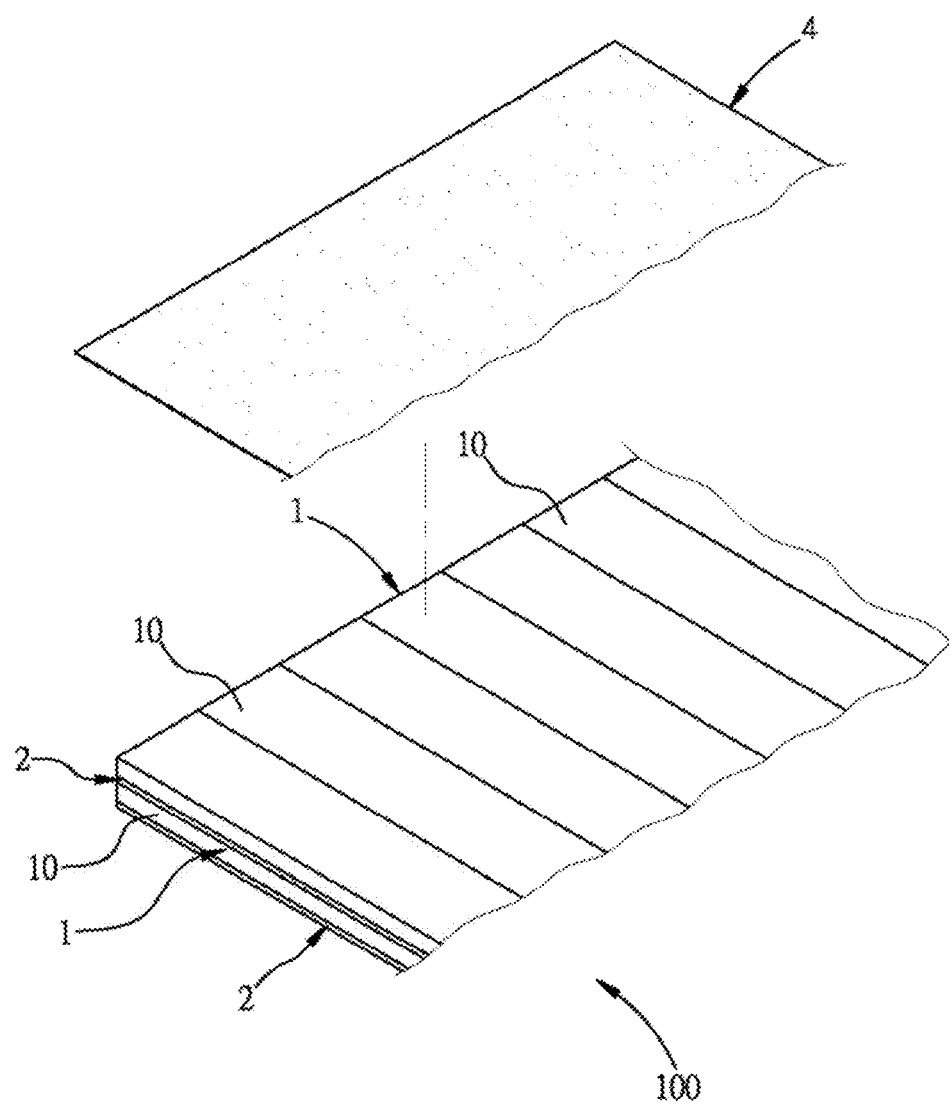
FIG. 2 is a schematic view showing the buffer board structure of this invention in combination.
Figure 3:
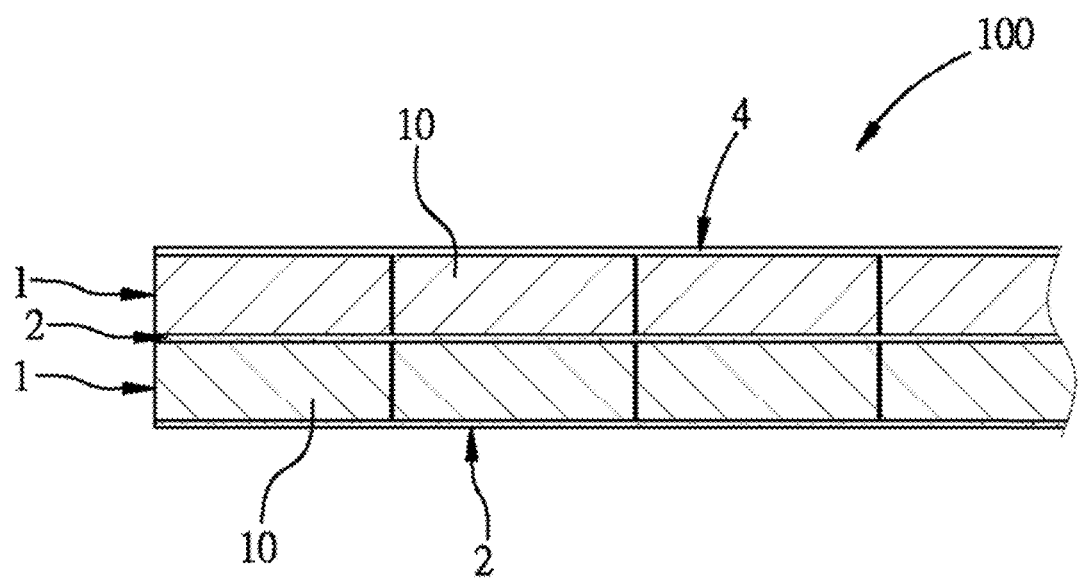
FIG. 3 is a cross-sectional view showing the buffer board structure of this invention.
Figure 4:
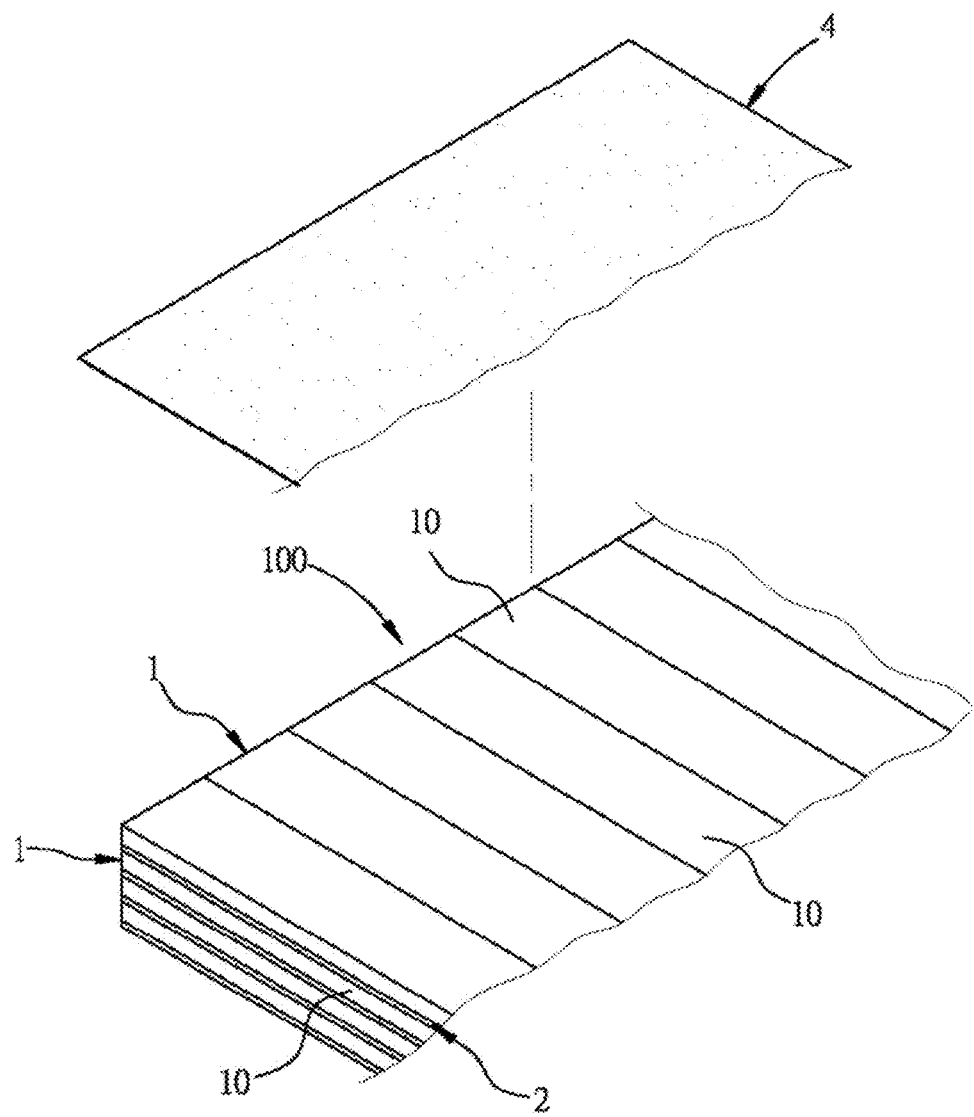
FIG. 4 is a perspective view showing the buffer board structure of this invention.
Figure 5:
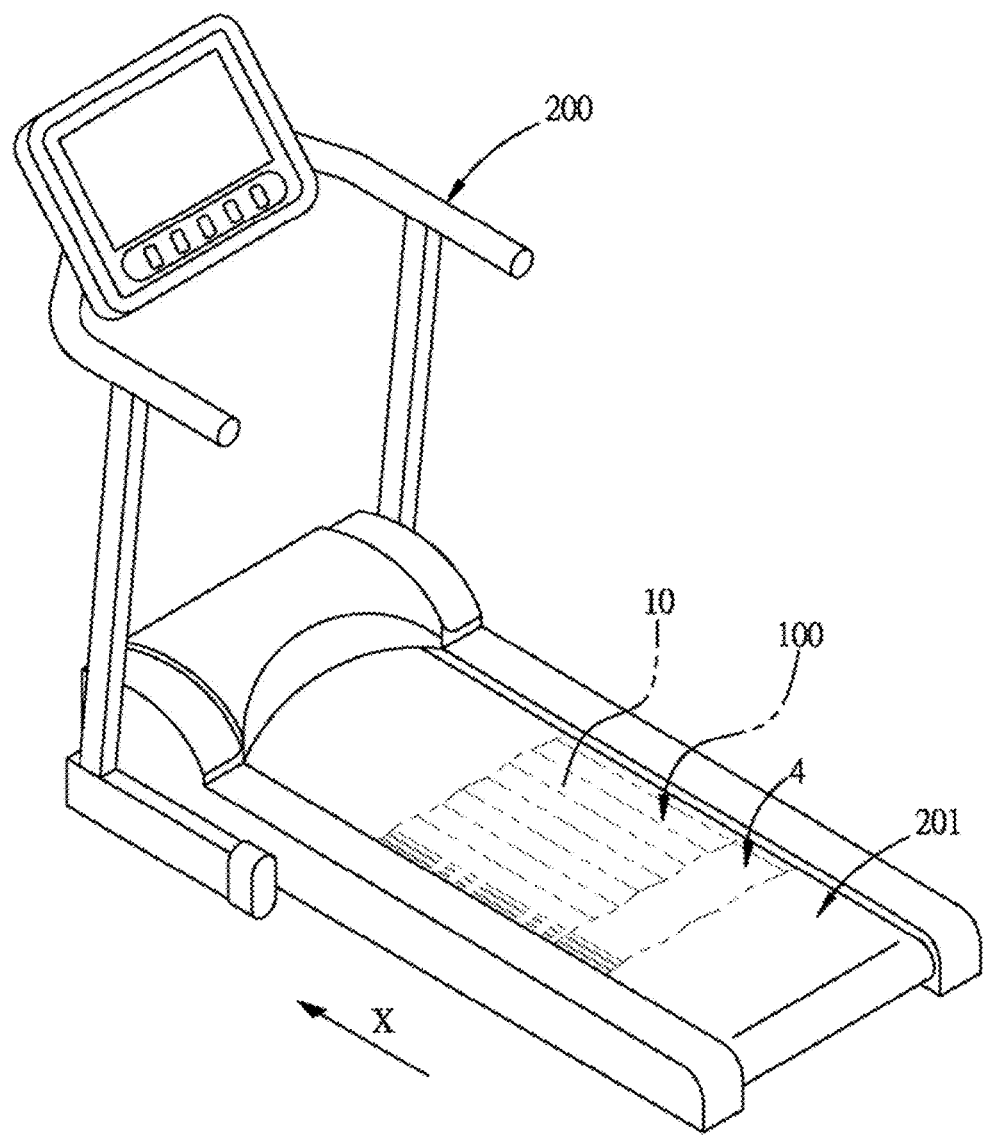
FIG. 5 is a perspective view showing a treadmill in combination with the buffer board structure of this invention.

FIG. 1 is an exploded view showing a buffer board structure of a treadmill of this invention. FIG. 2 is a schematic view showing the buffer board structure of this invention in combination. FIG. 3 is a cross-sectional view showing the buffer board structure of this invention. FIG. 4 is a perspective view showing the buffer board structure of this invention. FIG. 5 is a perspective view showing a treadmill in combination with the buffer board structure of this invention.

A buffer board structure 100 of this invention is installed under a belt 201 of a treadmill 200. When the belt 201 is trodden and subjects the buffer board structure 100 to a downward impact, a buffer bounce is created. The buffer board structure 100 comprises a plurality of bamboo layers 1 and a plurality of membrane layers 2.

The bamboo layers 1 are put one over another to form a superimposing arrangement. The adjacent bamboo layers 1 are superimposed along an axial direction.

Further, each bamboo layer 1 is made of a plurality of bamboo sheets 10 parallel to each other. Referring to FIG. 1, the bamboo sheets 10 of the bamboo layer 1 at a top position define an axial direction "X". The bamboo sheets 10 of the bamboo layer 1 at a middle position also define the same axial direction "X". The axial direction "X" can be parallel to a running direction of the treadmill 200. Therefore, the use of the structure can attain the best flexibility to provide a preferable shock-absorbing capability and promote a buffering effect.

Each of the membrane layers 2 is laid between the two adjacent bamboo layers 1. The membrane layer 2 can be, but not limited to, a whole wood sheet, a combination of wooden laminating sheets, a woven cloth, a non-woven cloth, a whole plastic sheet or a combination of plastic laminating sheets.

An adhesive 3 can be arranged between each membrane layer 2 and each bamboo layer 1 so that the adjoining bamboo layer 1 and membrane layer 2 can stick together as a whole.

Further, a slip resistant layer 4 is laid on an upper surface of the bamboo layer 1 situated at the top position. Thus, when a user treads on the belt 201 of the treadmill 200, the slip resistant layer 4 helps reduce the contact resistance between the user and the belt 201 and prevents the breakdown of the bamboo sheets of the top bamboo layer 1.

From above, this invention puts a membrane layer 2 between two adjacent bamboo layers 1, so contact faces of the bamboo layers 1 and the membrane layer 2 which are adhered together become smoother and the adhesive 3 fills in a gap more evenly. The slip resistant layer 4 is stuck on the top bamboo layer 1. Thus, this invention provides the bamboo layers 1 with a smoother buffer bounce and a stable juxtaposing concatenation during the treading and sinking action, thereby promoting a buffering effect of the buffer board structure of this invention and preventing the breakdown of the buffer relations between the bamboo sheets 10 of the bamboo layers 1 and the membrane layers 2.

While the embodiment of this invention is disclosed, it is understood that further variations and modifications may be made without departing from the scope of this invention.

From the above description, it is clear to one of ordinary skill in the art that this invention can attain the stated objects and thus can meet the requirement of patentability upon submission.

What is claimed is:

1. A buffer board structure of a treadmill being installed under a belt of said treadmill and applied to create a buffering effect when said belt is trodden to sink and impact on said buffer board structure, said buffer board structure comprising:
    a plurality of bamboo layers which are placed one over another, each of said bamboo layers including a plurality of bamboo sheets attached side by side along an axial direction, said bamboo sheets of any two of said adjacent bamboo layers being parallel to each other along said axial direction;
    a plurality of membrane layers, each of said membrane layers being laid between said two adjacent bamboo layers;
    an adhesive arranged between each of said membrane layers and each of said bamboo layers to adhere said bamboo layer to said membrane layer; and
    a slip resistant layer adhered to an upper surface of one of said bamboo layers which is placed at a top position, wherein each of said membrane layers is a whole plastic sheet or is made by laminating plastic sheets.

2. A buffer board structure of a treadmill being installed under a belt of said treadmill and applied to create a buffering effect when said belt is trodden to sink and impact on said buffer board structure, said buffer board structure comprising:
    a plurality of bamboo layers which are placed one over another, each of said bamboo layers including a plurality of bamboo sheets attached side by side along an axial direction, said bamboo sheets of any two of said adjacent bamboo layers being parallel to each other along said axial direction;
    a plurality of membrane layers, each of said membrane layers being laid between said two adjacent bamboo layers;
    an adhesive arranged between each of said membrane layers and each of said bamboo layers to adhere said bamboo layer to said membrane layer; and
    a slip resistant layer adhered to an upper surface of one of said bamboo layers which is placed at a top position, wherein each of said membrane layers is a woven cloth or a non-woven cloth.

\* \* \* \* \*